United States Patent
Hoehn et al.

(10) Patent No.: US 11,708,059 B2
(45) Date of Patent: Jul. 25, 2023

(54) METHOD FOR MANAGING A CONTROL SOFTWARE OF A BRAKING SYSTEM OF A VEHICLE, A HYDRAULIC SYSTEM FOR A BRAKING SYSTEM OF A VEHICLE AND A METHOD FOR MANUFACTURING THE SAME

(71) Applicant: Robert Bosch GmbH, Stuttgart (DE)

(72) Inventors: Juergen Hoehn, Abstatt (DE); Lothar Backes, Ilsfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 736 days.

(21) Appl. No.: 16/611,082

(22) PCT Filed: Mar. 22, 2018

(86) PCT No.: PCT/EP2018/057355
§ 371 (c)(1),
(2) Date: Nov. 5, 2019

(87) PCT Pub. No.: WO2018/219518
PCT Pub. Date: Dec. 6, 2018

(65) Prior Publication Data
US 2020/0164849 A1   May 28, 2020

(30) Foreign Application Priority Data
May 31, 2017 (DE) .............. 10 2017 209 104.5

(51) Int. Cl.
*B60T 17/22* (2006.01)
*G06F 8/654* (2018.01)
*B60T 17/00* (2006.01)

(52) U.S. Cl.
CPC ............ *B60T 17/221* (2013.01); *B60T 17/00* (2013.01); *G06F 8/654* (2018.02); *B60T 2270/00* (2013.01)

(58) Field of Classification Search
CPC .............................. B60T 17/221; G06F 8/654
See application file for complete search history.

(56) References Cited

U.S. PATENT DOCUMENTS

2004/0254689 A1* 12/2004 Blazic .................. G06F 8/61
701/1
2009/0119657 A1* 5/2009 Link, II ................ G06F 8/64
717/171
(Continued)

FOREIGN PATENT DOCUMENTS

CN   102458941 A   5/2012
CN   105813910 A   7/2016
(Continued)

OTHER PUBLICATIONS

International Search Report for PCT/EP2018/057355, dated Oct. 18, 2018.
(Continued)

*Primary Examiner* — Eric S. McCall
*Assistant Examiner* — Timothy P Graves
(74) *Attorney, Agent, or Firm* — Norton Rose Fulbright US LLP; Gerard Messina

(57) ABSTRACT

A method for managing a control software of a braking system of a vehicle, the method including downloading, a vehicle-adapted control software from a server via a wireless interface of the vehicle, and flashing a control unit of the braking system with the vehicle-adapted control software.

9 Claims, 3 Drawing Sheets

(56) References Cited

U.S. PATENT DOCUMENTS

| | | | | |
|---|---|---|---|---|
| 2014/0109075 A1* | 4/2014 | Hoffman | ............ | G06F 11/1464 717/169 |
| 2016/0026458 A1* | 1/2016 | Wist | ........................ | G06F 8/658 717/168 |

FOREIGN PATENT DOCUMENTS

| | | | | |
|---|---|---|---|---|
| CN | 106257416 A | 12/2016 | | |
| DE | 4028561 A1 * | 3/1992 | ............ | G01L 5/282 |
| DE | 4028561 A1 | 3/1992 | | |
| DE | 102015115855 A1 | 3/2017 | | |
| JP | H09120364 A | 5/1997 | | |
| JP | 2000344069 A * | 12/2000 | ............ | B60T 8/172 |
| JP | 2000344069 A | 12/2000 | | |
| JP | 2003108383 A | 4/2003 | | |
| JP | 2005157637 A | 6/2005 | | |
| JP | 2005202594 A | 7/2005 | | |
| JP | 2005349878 A | 12/2005 | | |
| JP | 2009120364 A | 6/2009 | | |
| KR | 20110126291 A | 11/2011 | | |
| WO | 2005105534 A1 | 11/2005 | | |
| WO | 2008081619 A1 | 7/2008 | | |
| WO | 2012043167 A1 | 4/2012 | | |
| WO | 2014088567 A1 | 6/2014 | | |

OTHER PUBLICATIONS

"Automobile Chassis Structure, Principle and Maintenance Vehicle Driving and Handling System", vol. 2, Mar. 31, 2015, Ed. Zhao Zhenning, Beijing Institute of Technology Press, pp. 185-189, with English translation of certain technical terms.

* cited by examiner

METHOD FOR MANAGING A CONTROL SOFTWARE OF A BRAKING SYSTEM OF A VEHICLE, A HYDRAULIC SYSTEM FOR A BRAKING SYSTEM OF A VEHICLE AND A METHOD FOR MANUFACTURING THE SAME

FIELD OF THE INVENTION

The present invention relates to a method for managing a control software of a braking system of a vehicle, a hydraulic system for a braking system for a vehicle and a method for manufacturing a hydraulic system for a braking system.

BACKGROUND INFORMATION

In a braking system, such as an ESP system, a control software matched to a specific vehicle model is loaded during the production of the system. This results in a version of the control software that is up to date at the time of the production.

SUMMARY OF THE INVENTION

Against this background, a method for managing a control software of a braking system of a vehicle, a hydraulic system for a braking system for a vehicle, and finally a method for manufacturing a hydraulic system for a braking system according to the description herein is described with the approach presented herein. Advantageous refinements of and improvements on the approach presented herein are described herein.

Described is a method for managing a control software of a braking system of a vehicle, a hydraulic system for a braking system of a vehicle and a method for manufacturing the same.

Specific embodiments of the present invention may advantageously make it possible to improve a control software for a braking system, in particular, for an ESP braking system, until a vehicle is fully assembled. In this way, the parameters of the control software may be more precisely established. Thus, for example, changes to the vehicle type may be responded to during the course of a production period. Stock of inventory may also be simplified, since a type of hydraulic system according to the approach presented herein may be installed in different vehicle types.

A method for managing a control software of a braking system of a vehicle is presented, the method being characterized in that in a step of downloading, a vehicle-adapted control software is downloaded from a server via a wireless interface of the vehicle, and in a step of flashing, a control unit of the braking system is flashed with the vehicle-adapted software.

A hydraulic system for a braking system is also presented, a control unit of the hydraulic system being configured to carry out, implement and/or activate the method according to the approach presented herein in corresponding devices.

Furthermore, a method for manufacturing a hydraulic system for a braking system of a vehicle is presented, the method including the following steps:

manufacturing a flashable control unit of the hydraulic system and a hydraulic unit of the hydraulic system;

programming the control unit using a verification and test software for the control unit, a verification and test software for the hydraulic system and a verification and test software for actuators of the braking system, as well as a vehicle-adapted control software for the braking system and a boot manager for flashing the control unit;

testing an electrical function of the control unit using the verification and test software for the control unit;

assembling the control unit and the hydraulic unit to form the hydraulic system; and testing a mechanical function of the hydraulic system using the verification and test software for the hydraulic system.

Ideas regarding specific embodiments of the present invention may be considered to be based, among other things, on the concepts and findings described below.

In all vehicle types the brakes are available for influencing the driving stability via a braking system, in particular, an ESP system. The brakes are activated hydraulically. The hydraulic systems of various vehicle types are mechanically and electrically very similar as long as a vehicle includes four wheels. For each brake, the hydraulic systems include essentially a group of individually activatable hydraulic valves. The hydraulic valves are activated vehicle-specifically in different vehicle types via different control software. In the vehicle-adapted control software, for example, vehicle-specific geometric ratios, mass distributions and/or performance data are taken into consideration.

The control software is stored in a non-volatile memory of a control unit of the braking system. The memory may, for example, be a ROM or a PROM or, in particular, an EPROM. This memory may be initially written during the production of the control unit or during the production of the hydraulic system. In the approach presented herein, a general control software is stored during the production. The general control software makes possible, for example, a system test of the braking system during the production of the vehicle.

When the vehicle is assembled, the components thereof are assembled and attached. Once a hydraulic system is installed, it is finally determined in which vehicle type it is installed. Once installed, it is possible already to supply electrical components with electrical power. As of this point in time, therefore, the components are able to pass through an initialization sequence while the vehicle continues to be assembled.

The method presented herein may be carried out before the vehicle is delivered to the customer. Flashing may be understood to mean an overwriting of data stored in a read-only memory (ROM, PROM, EPROM) of the control unit. In this case, the general control software may be deleted and overwritten with a version of the final control software for this vehicle type that is up to date at that point in time. The read-only memory may also only be partially written in advance.

The method may include a step of starting, in which a pre-installed boot manager of the braking system is started, the boot manager controlling and securing the steps of downloading and of flashing. The boot manager may trigger the flashing when the control software previously stored in the control unit is deleted. The emptied memory of the control unit may subsequently be written with the vehicle-adapted control software.

In the step of flashing, a pre-installed vehicle-adapted control software may be overwritten. As a result of flashing, the braking system is able to obtain its full range of functions.

The downloading may be carried out on a central system of the vehicle via an interface of the central system to the braking system. A central system may, for example, be a navigation system or an infotainment system of the vehicle.

The central system may establish a mobile data connection to the server. The central system may also ensure the security of the data connection, for example, via a virus scan and/or a firewall.

The step of flashing may be carried out when the vehicle is turned off. Flashing may be carried out when the vehicle is stationary. This may ensure that the braking system is always operational.

The steps of downloading and of flashing may be carried out again if an updated, vehicle-adapted control software is available. In this case, the updated vehicle-adapted control software may be downloaded in the step of downloading. In the step of flashing, the control unit may be flashed with the updated control software. With a subsequent updating of the control software, it is possible to achieve improvements to the control software without a workshop visit.

The method for manufacturing may include a step of deactivation, in which the verification and test software for the control unit and the verification and test software for the hydraulic system are deactivated. The sequences activated by the verification and test software may no longer be carried out in the installed control unit. The verification and test software is therefore no longer required. The verification and test software may also be deleted in order to free up memory space in the control unit.

Before the step of testing the mechanical function of the hydraulic system, it is possible using the boot manager to switch from the verification and test software for the control unit to the verification and test software for the hydraulic system. The sequence activated by the verification and test software for the control unit may no longer be carried out in the assembled hydraulic system. The verification and test software and the boot manager required for this purpose are therefore no longer required.

It is noted that some of the possible features and advantages of the present invention are described herein with reference to different specific embodiments as a method for managing, as a control unit and as a method for manufacturing. Those skilled in the art recognize that the features may be suitably combined, adapted or replaced in order to arrive at additional specific embodiments.

Specific embodiments of the present invention are described below with reference to the appended drawings; neither the drawings nor the description are to be interpreted as limiting the present invention.

The figures are merely schematic and not true to scale. Identical reference numerals in the figures refer to identical or identically operating features.

DETAILED DESCRIPTION

Figure 1:
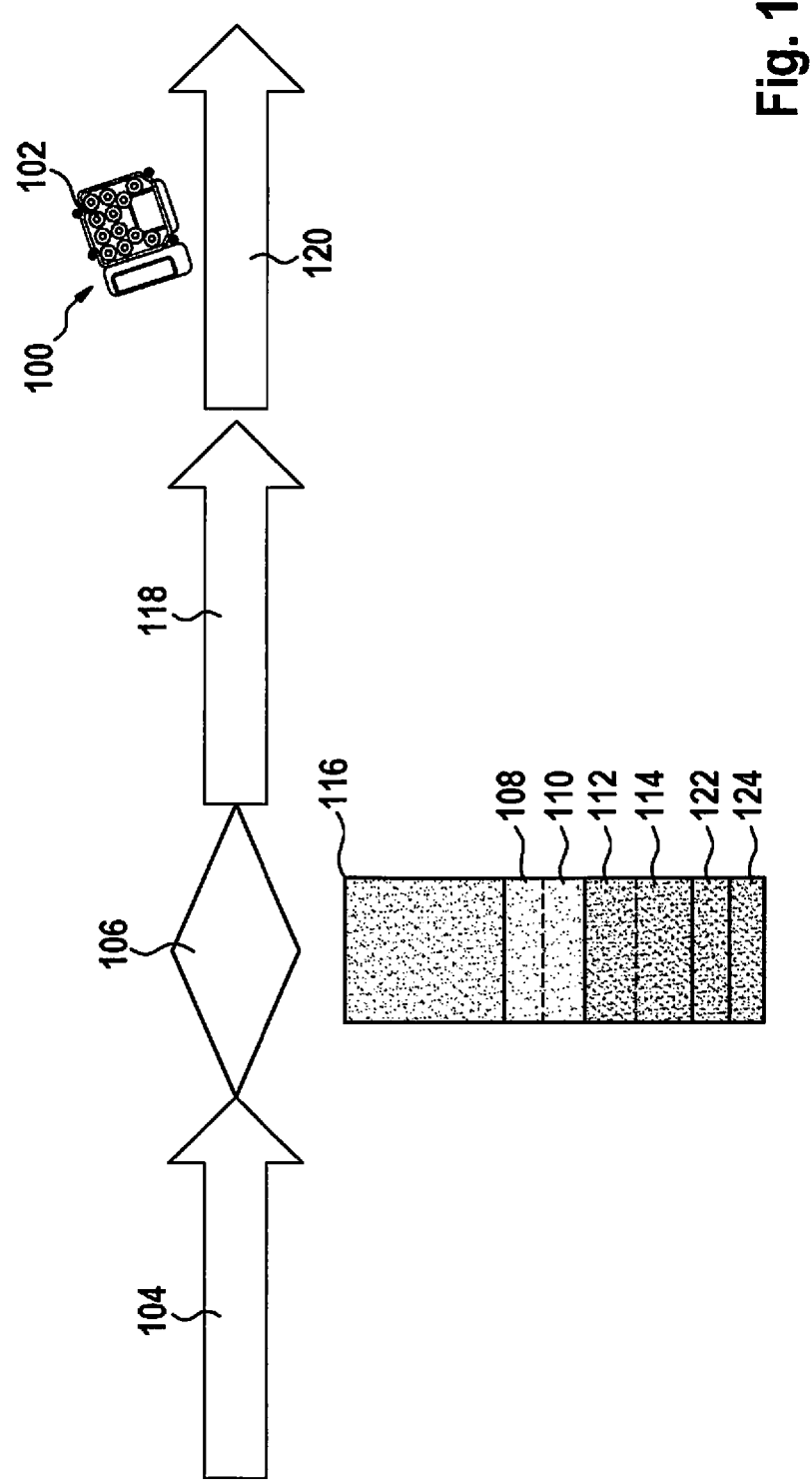
FIG. 1 shows a flow chart of a production of a control unit for a hydraulic system according to one exemplary embodiment.

FIG. 1 shows a flow chart of a production of a control unit 100 for a hydraulic system according to one exemplary embodiment. Control unit 100 in this case is connected to an actuator unit 102 for activating valves of a hydraulic unit. The hydraulic system is part of a braking system of a vehicle. A driver assistance system such as, for example, ESP, is implemented in the braking system. Actuator unit 102 includes electrical coils here for solenoid valves of the hydraulic unit. Control unit 100 and actuator unit 102 are manufactured in a step 104 of manufacturing as a shared assembly group.

During manufacturing 104, control unit 100 is programmed in a step 106 of programming using a verification and test software 108. Verification and test software 108 is written with multiple subprograms 110, 112, 114 into a memory 116 of control unit 100. Verification and test software 108 in this case occupies only a small portion of memory 116. Programming 106 therefore takes only a moment. This verification and test software is made up of subprograms 110, 112, 114 for the electronic functions as well as for checking the hydraulic functions, if necessary, of a boot manager 114 for activating or deactivating individual subprograms 110, 112, 114. Subprograms 110, 112, 114 in this case are activatable individually. Electronics test software 110 is activated in step 106 of programming for the production of control unit 100.

In a subsequent step 118 of testing, the individual components of control unit 100 and of actuator unit 102 are tested for their intended function in the uninstalled state using electronics test software 110. It is checked, for example, whether all components are electrically connected.

If the intended function has been identified during testing 118, control unit 100 and actuator unit 102 are delivered in a step 120.

In one exemplary embodiment, in step 106 of programming, an assembly test software 122 for checking the components of the complete system when assembled in the vehicle is also written as a subprogram into memory 116 and deactivated.

In one exemplary embodiment, in step 106 of programming, a control software 124 not adapted to one vehicle type or vehicle non-adapted, is also written into memory 116. The vehicle non-adapted control software provides a basic functionality of the braking system when the hydraulic system is installed in the vehicle. The vehicle non-adapted control software 124 offers, for example, interfaces to electronics of the vehicle, as they are provided by a vehicle-adapted control software. As a result of this basic functionality of the braking system, the vehicle is able to be moved during production without resulting in error messages of the vehicle electronics. Vehicle non-adapted control software 124 has a minimal memory requirement.

Figure 2:
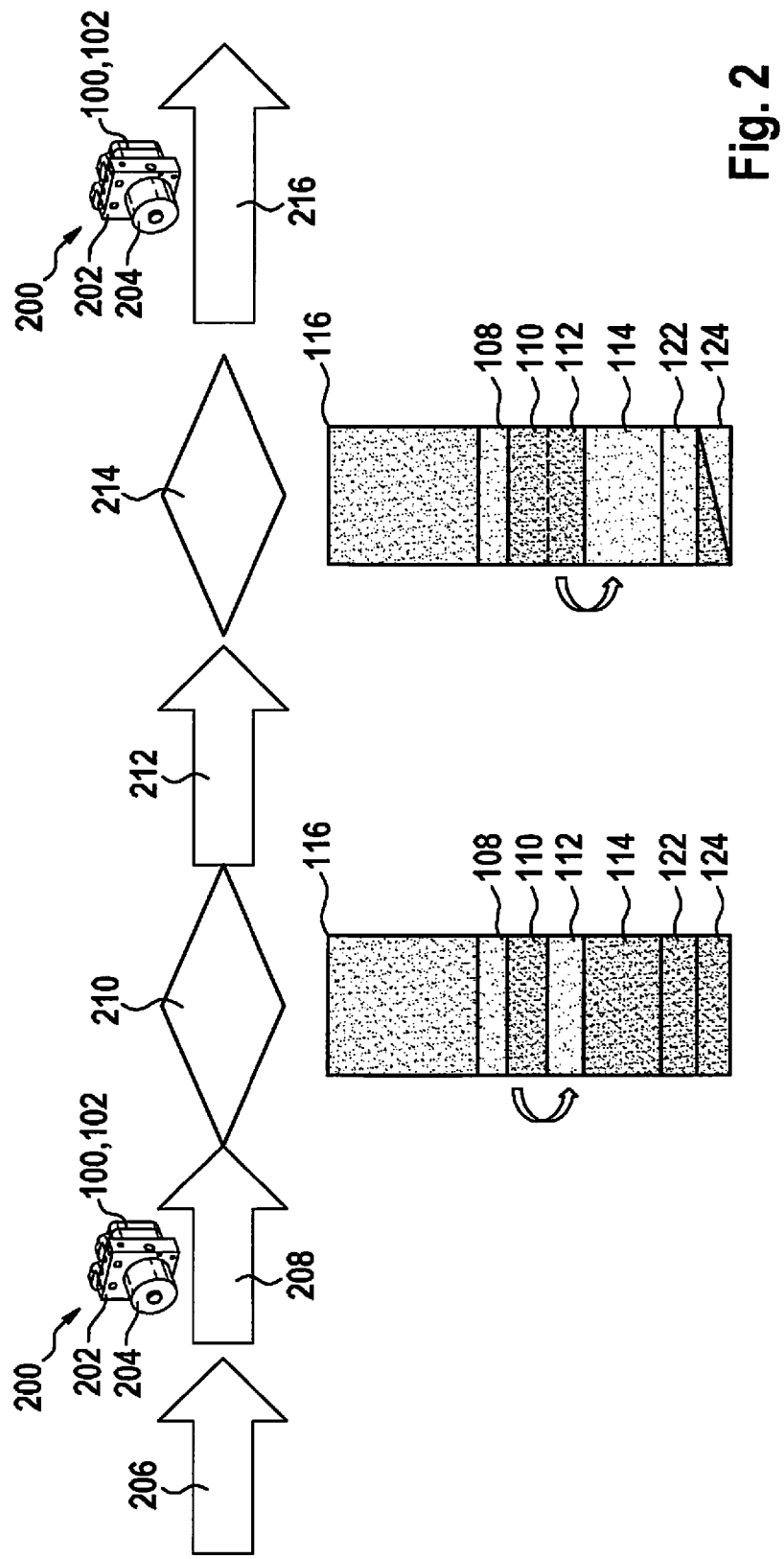
FIG. 2 shows a flow chart of a production of a hydraulic system according to one exemplary embodiment.

FIG. 2 shows a flow chart of a production of a hydraulic system 200 according to one exemplary embodiment. Hydraulic system 200 in this case is made up of a control unit 100 and an actuator unit 102 as they are described in FIG. 1, as well as a hydraulic block 202. Hydraulic block 202 in this case also includes a hydraulic pump, which is driven by an electric motor 204 of hydraulic system 200.

Hydraulic block 202 including electric motor 204 is manufactured in a step 206 of manufacturing. In a step 208 of assembling, control unit 100 and actuator 102 are connected to hydraulic block 202 and electric motor 204.

In a step 210 of programming or switching, boot manager 114 is used to deactivate electronics test software 110 and to activate complete test software 112. The programming or switching 210 requires only very little time, since complete verification and test software 108 was already written into memory 116 during the production of control unit 100.

The programming may also have taken place already during the production of control unit 100 prior to the delivery of control unit 100 with actuator unit 102. Step 210 may then be skipped.

In a subsequent step 212 of testing, hydraulic system 200 is tested for its proper function using complete test software 112. For example, the solenoid valves are actuated and end positions of the closure parts of the solenoid valves are recorded. In step 212 of testing, hydraulic system 200 may also be connected to a testing system and may be supplied with hydraulic fluid. Via the testing system, it is possible, for example, to record characteristic curves of the pump and/or of the solenoid valves for calibrating hydraulic system 200. The recorded data may be stored in control unit 100.

If hydraulic system 200 functions properly, boot manager 114 is used again in an additional step 214 of programming. In this step, complete test software 112 is deactivated and boot manager 114 is activated. After reprogramming 214, hydraulic system 200 is delivered in a step 216 of delivering.

In one exemplary embodiment, assembly test software 122 instead of boot manager 114 is activated in additional step 214 of programming, via which the proper installation of the hydraulic system in the vehicle may be monitored.

In one exemplary embodiment, boot manager 114 is used in additional step 214 of programming in order to activate vehicle non-adapted control software 124. Vehicle non-adapted control software 124 reflects outwardly the expected interfaces to the vehicle, as would also be done by a vehicle-adapted control software. In this way, error messages during assembly are avoided, since the vehicle electronics are able to communicate as expected with hydraulic system 200.

In other words, a check of complete system 200 takes place in the factory for hydraulic system 200 with the aid of verification and test software 108 already installed in the factory for control unit ECU 100. In the process, a switch is made from subprogram 110 required in the control unit to subprogram 112 required in the hydraulic system solely with the aid of a boot loader 114. As a consequence, all testing steps take place in this manufacturing sequence using a standard software SW 108, which contains no customer-specific features.

Figure 3:
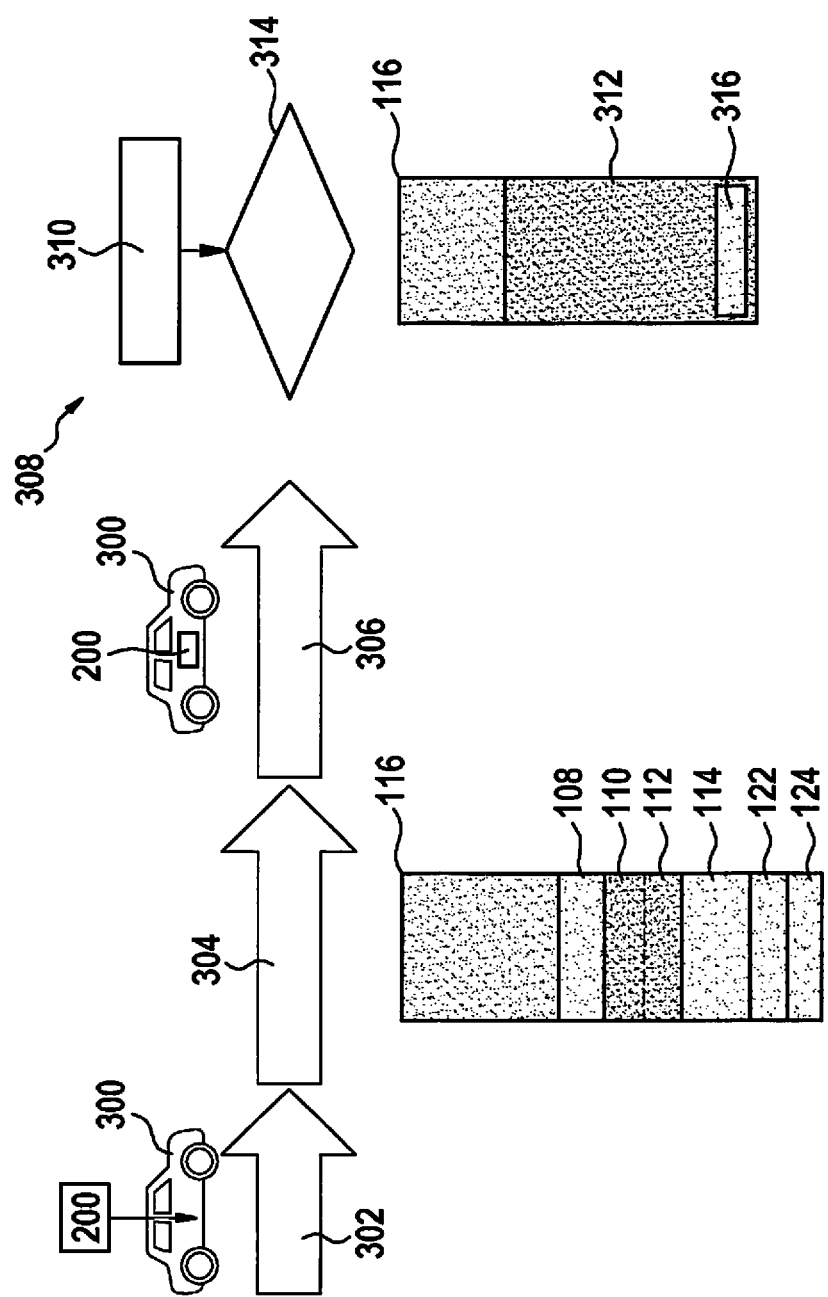
FIG. 3 shows a flow chart of an assembly of a vehicle with a hydraulic system according to one exemplary embodiment.

FIG. 3 shows a flow chart of an assembly of a vehicle 300 including a hydraulic system 200 according to one exemplary embodiment. Hydraulic system 200 in this case corresponds essentially to the hydraulic system described in FIG. 2. The actual assembly takes place in a step 302 of installation. In the process, hydraulic system 200 is situated in vehicle 300, attached and connected to the systems of vehicle 300. Hydraulic system 200, together with the brakes and sensors on the wheels, forms a braking system with an electronic braking system of vehicle 300.

In a subsequent step 304 of testing, the systems of vehicle 300 are tested in vehicle 300. Hydraulic system 200 is also checked in the process. When the systems have been checked and they function as expected, vehicle 300 is delivered in a step 306 of delivery.

Before vehicle 300 is finally delivered to its user, a method 308 for managing control software 124 of the braking system is carried out. In this method, a vehicle-adapted control software 312 is downloaded in a step 310 from a server via a wireless interface of vehicle 300. In a subsequent step 314 of flashing, the control unit of the braking system is flashed with the vehicle-adapted control software 312. During flashing 314, memory 116 of the control unit is at least partially deleted and is overwritten with the vehicle-adapted control software 312. The verification and test software subprograms 108 through 112 are also deleted in the process.

Method 308 for managing may be already carried out as soon as hydraulic system 200 is electrically contacted. In one exemplary embodiment, method 308 for managing is carried out subsequent to step 304 of testing.

In one exemplary embodiment, method 308 for managing is carried out again if a newer version of vehicle-adapted control software 312 is available. In this case, access is gained again via the wireless data interface and the newer version is downloaded. Thereafter, step 314 of flashing is carried out again and the control unit is flashed with the new version of vehicle-adapted control software 312. In this case, flashing 314 may be carried out when vehicle 300 is parked. Flashing 314 may also be carried out while the vehicle is in use. The flashing is then carried out when no control intervention of the braking system is required, i.e., for example, when vehicle 300 is stopped.

In one exemplary embodiment, a diagnostic program 316 is downloaded in step 310 of downloading in addition to control software 312 and is also written into memory 116 in step 314 of flashing. After flashing 314, diagnostic program 316 is carried out. Method 308 may be carried out again if an error is detected.

In other words, the vehicle manufacturer installs system 200, tests its vehicle assembly with the aid of diagnostic analysis and end of assembly line tests and delivers vehicle 300. Before delivery of vehicle 300 to the customer, a flash operation 314 takes place, in which final software 312 is installed. The time period between the production of system 200 and the installation in vehicle 300 or the final start-up may be utilized for refining software 312, which results in a savings in lead times.

With the approach presented herein, it is possible with the aid of FOTA technology (flashing over the air) to carry out a software update to systems 200 delivered in the field. System 200 is delivered without a complete functioning software, product 200 becomes fully functional only via first FOTA process 314. In this way, the factory processes may be passed through during the manufacture of system 200 using a vehicle-independent, standard and freely modifiable test software 108. In addition to the test portions 110, 112, this test software has the ability to be overwritten via FOTA and meets the most up-to-date security requirements required at this point in time.

A rudimentary functionality 124 may be provided when needed, which ideally may be standard across all vehicle models. The limited function in this case includes at least one backup EBD, a speed sensor processing and an output of the tachometer signal. Product 200 is not fully functional as long as no FOTA process 314 has been carried out.

Only a subsection of memory 116 must be programmed during the manufacture of hydraulic system 200. Complete system 200 may be produced without being directly assigned to a specific vehicle, the final determination of the target vehicle takes place only after assembly 302 in vehicle 300. In this case, the vehicle manufacturer may use exactly the same braking system 200 in various vehicles 300. The required differences in functionality are installed only during flashing 314 of control software 321, as long as the hardware is the same. Hydraulic system 200 is updatable.

The approach presented herein is described for a braking system with ESP. It may also be used in other systems in vehicle 300, such as engine control, navigation systems, and instruments.

Finally, it should be noted that terms such as "including", "encompassing", etc. do not exclude any other elements or steps and terms such as "one" do not exclude a plurality. Reference numerals in the claims are not to be considered as limiting.

What is claimed is:

1. A method for managing a control software of a braking system of a vehicle, the method comprising:
installing a vehicle non-adapted control software into a control unit of the braking system, where the vehicle non-adapted control software is not adapted to a type of the vehicle, the vehicle non-adapted control software including interfaces, to other electronics of the vehicle, provided by a vehicle-adapted control software, so that the control unit with the vehicle non-adapted control software is able to communicate with the other electronics;
downloading the vehicle-adapted control software from a server via a wireless interface of the vehicle, wherein the vehicle-adapted control software includes parameters based on at least one of: a geometric ratio specific to the type of the vehicle, a mass distribution specific to the type of the vehicle, or performance data specific to the type of the vehicle; and
flashing the control unit of the braking system with the vehicle-adapted control software, wherein the installed vehicle non-adapted control software is overwritten in the flashing.

2. The method of claim 1, further comprising:
starting a pre-installed boot manager of the braking system, the boot manager activating the downloading and the flashing.

3. The method of claim 1, wherein the downloading is carried out on a central system of the vehicle via an interface of the central system to the braking system.

4. The method of claim 1, wherein the flashing is carried out when the vehicle is turned off.

5. The method of claim 1, wherein the downloading and the flashing are carried out again if an updated vehicle-adapted control software is available, the updated vehicle-adapted control software being downloaded in the downloading, and the control unit being flashed in the flashing with the updated control software.

6. A hydraulic system for a braking system of a vehicle, comprising:
a control unit of the hydraulic system configured for managing a control software of the braking system of the vehicle, by performing and/or activating the following:
downloading a vehicle-adapted control software from a server via a wireless interface of the vehicle, wherein the vehicle-adapted control software includes parameters based on at least one of: a geometric ratio specific to the type of the vehicle, a mass distribution specific to the type of the vehicle, or performance data specific to the type of the vehicle; and
flashing the control unit of the braking system with the vehicle-adapted control software, wherein a previously installed vehicle non-adapted control software is overwritten in the flashing, the vehicle non-adapted control software being not adapted to a type of the vehicle, and the vehicle non-adapted control software including interfaces, to other electronics of the vehicle, provided by the vehicle-adapted control software, so that the control unit with the vehicle non-adapted control software is able to communicate with the other electronics.

7. A method for manufacturing a hydraulic system for a braking system of a vehicle, the method comprising:
manufacturing a flash-able control unit of the hydraulic system and a hydraulic unit of the hydraulic system;
programming the control unit using a verification and test software for the control unit, a verification and test software for the hydraulic system and a verification and test software for actuators of the braking system, and a vehicle non-adapted control software for the braking system and a boot manager for flashing the control unit, the vehicle non-adapted control software is not adapted to a type of the vehicle, and the vehicle non-adapted control software including interfaces, to other electronics of the vehicle, provided by a vehicle-adapted control software, so that the control unit with the vehicle non-adapted control software is able to communicate with the other electronics;
testing an electrical function of the control unit using the verification and test software for the control unit;
assembling the control unit and the hydraulic unit to form the hydraulic system; and
testing a mechanical function of the hydraulic system using the verification and test software for the hydraulic system.

8. The method of claim 7, further comprising:
deactivating the verification and test software for the control unit for the hydraulic system.

9. The method of claim 7, wherein before the testing of the mechanical function of the hydraulic system, switching from the verification and test software for the control device to the verification and test software for the hydraulic system using the boot manager.

* * * * *